Figure 4:
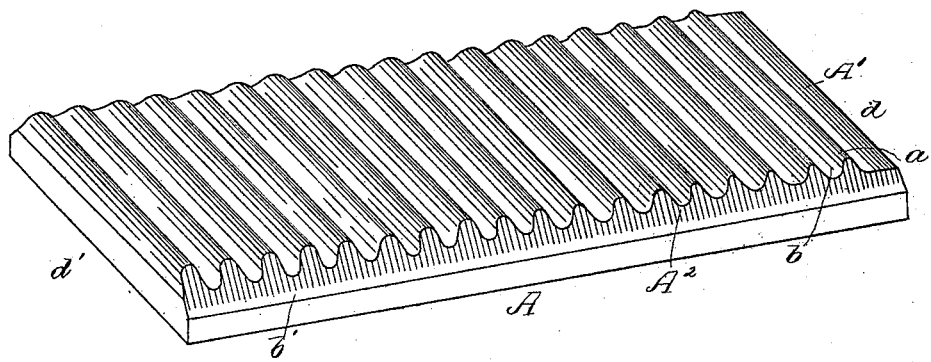

(No Model.) 3 Sheets—Sheet 1.
G. F. SIMONDS.
APPARATUS FOR AND METHOD OF MAKING ROLLED FORGINGS.
No. 440,763. Patented Nov. 18, 1890.
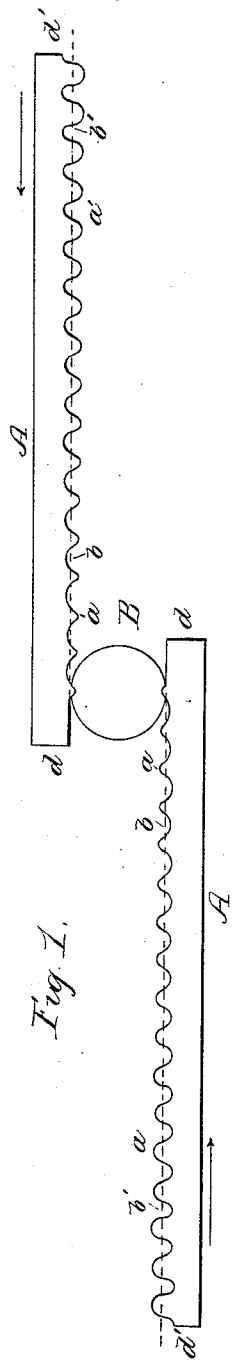
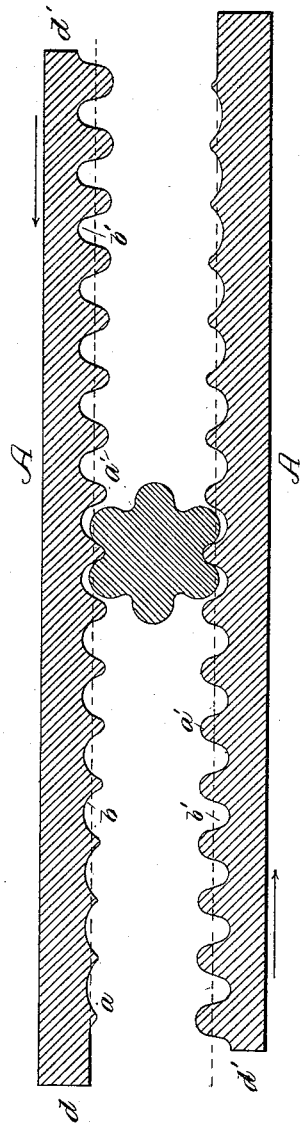
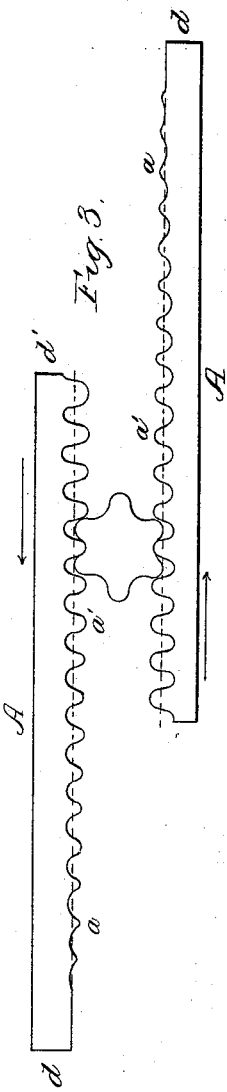
Witnesses
Jas. J. Maloney.
Lillian E. Preston
Inventor,
George F. Simonds,
by Jos. P. Livermore
Att'y.

(No Model.) 3 Sheets—Sheet 2.
G. F. SIMONDS.
APPARATUS FOR AND METHOD OF MAKING ROLLED FORGINGS.

No. 440,763. Patented Nov. 18, 1890.

Witnesses
Jas. J. Maloney
Lillian E. Preston

Inventor
George F. Simonds,
by Jo. P. Livermore
Att'y.

THE NORRIS PETERS CO., PHOTO-LITHO., WASHINGTON, D. C.

(No Model.)
G. F. SIMONDS.
APPARATUS FOR AND METHOD OF MAKING ROLLED FORGINGS.
No. 440,763. Patented Nov. 18, 1890.
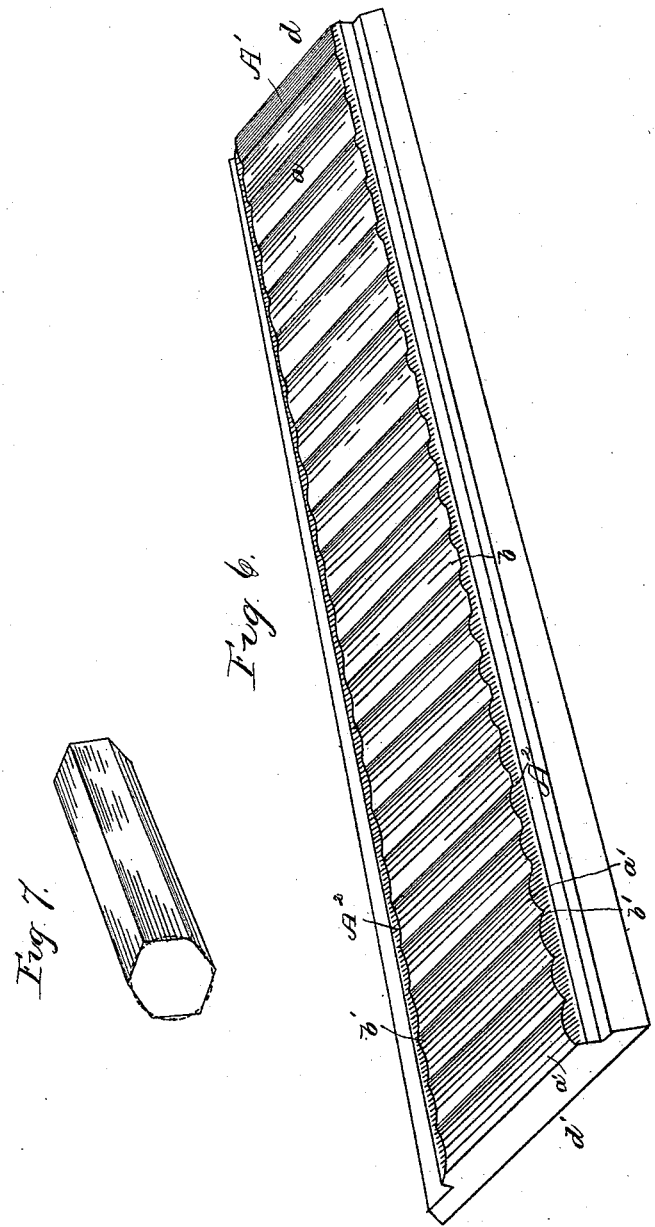
Witnesses
Jas. J. Maloney.
Lillian E. Preston
Inventor,
George F. Simonds
by Jos. P. Livermore
Att'y.

UNITED STATES PATENT OFFICE.

GEORGE F. SIMONDS, OF FITCHBURG, MASSACHUSETTS.

APPARATUS FOR AND METHOD OF MAKING ROLLED FORGINGS.

SPECIFICATION forming part of Letters Patent No. 440,763, dated November 18, 1890.

Application filed August 21, 1890. Serial No. 362,596. (No model.)

*To all whom it may concern:*

Be it known that I, GEORGE F. SIMONDS, of Fitchburg, county of Worcester, State of Massachusetts, have invented an Improvement in Apparatus for and Methods of Making Rolled Forgings Non-Circular in Cross-Section, of which the following description, in connection with the accompanying drawings, is a specification, like letters on the drawings representing like parts.

My invention relates to a method of and apparatus for making rolled forgings that are fluted, serrated, polygonal, or of other desired shape in cross-section by rolling a cylindrical blank or billet between dies that move in opposite directions.

In another application, Serial No. 362,597, filed August 21, 1890, I have shown and described a method of and apparatus for making rolled forgings of similar shape by means of dies having inclined spreading and reducing surfaces and a raised forming-surface between them, by which the billet or blank is first brought to the desired shape in cross-section for a short portion of its length, and the desired shape is gradually imparted to the other portions of the bar by crowding the surplus metal lengthwise of the bar. In the present invention the bar has the desired cross-sectional shape imparted to it over a considerable length by dies, which act on substantially the whole length to be shaped, but at first impart approximately the desired shape by making depressions around the periphery of the bar and crowding the surplus metal toward the sides of the depressions and into the parts that are to be of the largest diameter in the finished forging. The dies have raised portions or projections extending substantially the entire width of the working-faces of the dies, which raised portions project slightly or are of a small size at the part of the die that first begins to act on the blank and gradually increase in size or relief, so that as the blank rolls between the dies the successive larger projections act in the recesses in the blank made by the previously-acting smaller projections, thereby increasing the depth or size of the recesses or reduced portions of the forging and throwing more metal into the projecting portions of the forging, until finally it is brought to the desired shape in cross-section. The raised portions and intermediate recesses of the dies can be shaped and proportioned to the diameter of the forging, so as to produce a great variety of cross-sectional shapes in the forgings.

Figure 5:
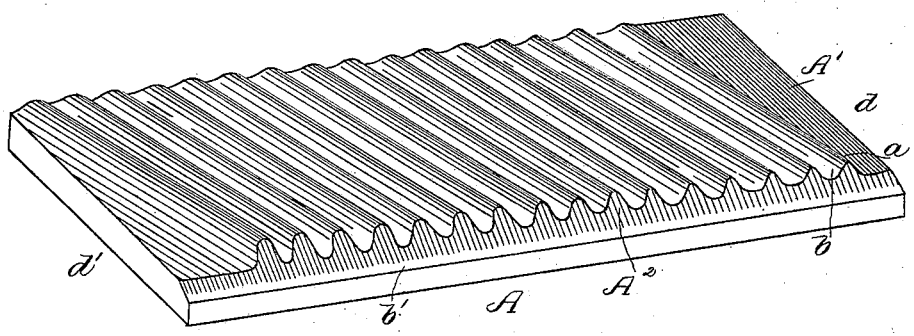

Figure 1 is a side elevation of a pair of dies properly shaped to make a fluted article having a waved cross-section, the dies being shown as just beginning to act on the blank; Fig. 2, a longitudinal section, on a larger scale, of the same dies, which are shown as having about one-half finished their action; Fig. 3, a side elevation showing the dies as having nearly finished their operation on the blank; Fig. 4, a perspective view of one of the dies; Fig. 5, a perspective view of a die for making a forging of similar shape in cross-section, but with the projections and recesses spirally arranged on its surface instead of being parallel with the axis, as would be effected by the die shown in Fig. 4; Fig. 6, a perspective view of a die properly shaped to make a polygonal forging, and Fig. 7 a perspective view of the forging produced by a pair of dies such as represented in Fig. 6.

The dies A A are adapted to be used in a machine such as shown in Letters Patent No. 319,752, dated June 9, 1885, the said dies being made in pairs and moved in opposite directions, as indicated in Figs. 1, 2, and 3. The working-faces of said dies are of a width equal to the length of the forging to be rolled, and the distance between the working-faces at the end $d$ that first begins to act on the blank is about equal to the diameter of the blank or billet, as represented at B, Fig. 1. The working-faces of said die are provided with a series of transverse projecting portions $a$ and intermediate recesses $b$, which are smallest or shallowest near the end $d$ of the die that begins to act on the blank, and gradually increase in size or relief to a point indicated at $a'$ between the ends of the die, and from said point $a'$ to the end $d'$ of the die which acts last upon the blank the said projections and the recesses $b'$ between them are uniform.

The operation of these dies and the method of forging the articles are as follows: The dies are first moved back in the direction opposite the arrows, Fig. 1, until the ends $d$ are about in line with one another, when the blank B, which may be a bar of iron, steel, or other metal heated to make it sufficiently plastic or yielding, is placed between the said ends $d$ and the dies move toward one another in the direction of the arrows, causing the blanks to rotate between the faces of the dies. The smallest or shallowest projections $a$ first meet the blank and sink into it, crowding the metal around the periphery of the blank, and thus tending to increase the diameter of the blank at each side of the place where the projection of the die acts. As the dies continue to move, the successive projections $a$ enter more deeply into the blank, making lengthwise depressions thereon and corresponding raised portions that enter the depressions $b$ of the dies, and the action is thus continued until the parts $a'$ of the dies reach the blank, after which the said uniform projections $a'$ and recesses $b'$ operate to bring all the projections and recesses of the blank into uniformity. The spacing of the ridges or projections along the dies is proportioned to the distance between the dies—that is, to the diameter of the blank—so that the ridges of each die will come into the depressions previously made in the blank by the other die, and the article will thus be forged by indenting it at opposite sides, causing it to rotate and indenting it at different points successively around its periphery and gradually increasing, deepening, or enlarging the indentations by successive actions at the same points.

It is obvious that by changing the shape of the projections on the working-faces of the dies the cross-sectional shape of the blank will be correspondingly changed, and by making the said projections and recesses of the dies diagonal, as shown in Fig. 5, instead of at right angles to the path of the dies, as shown in Figs. 1 to 4, the ridges and depressions on the blank will be spirally arranged around its periphery instead of being parallel to the axis of the forging, although the cross-sectional shape at any point may be the same as before, depending upon the shape of the ridges and depressions of the die, as seen in a longitudinal section of the die. By making the projections scalloped or wave-shaped, as shown in Fig. 6, and of proper length and curvature with relation to the diameter of the blank or distance between the working-faces of the dies, the blank will be rolled to a polygonal shape in cross-section, as shown in Fig. 7. The die shown in Fig. 6 is properly constructed to produce a hexagonal forging, the length of the curved ridges or projections $a'$ at the end $d'$ of the die being equal one-half the distance between the dies measured at the recesses $b'$, and it will be understood that by varying the length and curvature of the projections with relation to the distance between them other polygonal shapes can be produced, the principle of operation being substantially the same as that of producing a toothed or fluted forging by the dies represented in Figs. 1 to 4, as the faces of the polygonal are practically depressions with relation to the original cylindrical blank, as indicated in dotted lines, Fig. 7, and the corners or edges of the polygon are ridges or projections with relation to the surface of the said original billet. The ridges on the working-face of the die represented in Fig. 6 are made much narrower as well as shallower at the end $d$, where the action begins, than at the end $d'$, where the action of the die is completed, so that the depressions in the blank are gradually widened as well as deepened, and the same is true of the dies shown in the other figures, although not so noticeable to the eye.

In order to insure the proper rotation of the blank before the projections of the dies begin to act upon it, the working-faces of the dies near the end $d$ may be provided with small teeth or corrugations, as represented at A', Figs. 4, 5, and 6, which will engage with and positively rotate the blank without producing marks that will be too deep to be obliterated by the subsequent action of the dies, and, if required, the working-faces of the dies may also be provided with teeth along the sides of the shaping portion, as represented at $A^2$, which will engage the blank beyond the ends of the portion that is being shaped by the dies. This construction should be adopted when the depression and elevation of the working-faces of the dies are not themselves sufficiently prominent to insure the uniform rotation of the blank.

Dies such as herein described may be used as portions of composite dies, having other portions of various kinds, as shown in other patents and applications or inventions made by me, by which composite dies or portions of the forgings may be made circular in cross-section and other portions polygonal, fluted, or of any other desired non-circular cross-section. The different parts of said composite dies may act consecutively, or they may act simultaneously whenever the rotation of the blank can be uniform at the different points that are acted upon at the same moment by different parts of the die.

I claim—

1. Dies for forming metal articles non-circular in cross-section, having working-faces provided with alternate ridges and depressions increasing in size from one end of the die, substantially as and for the purpose described.

2. Dies for forming metal articles non-circular in cross-section, having working-faces composed of alternate ridges and depressions increasing in size from a minimum at one end of the die to a maximum at an intermediate point on the die and of uniform maximum size from this point to the other end of the die, substantially as described.

3. The herein-described method of making rolled forgings non-circular in cross-section, which consists in making indentations at different points successively around the blank while rotating the same and gradually enlarging the indentations by repeated pressure therein and crowding the displaced metal into the raised portions or projections between the indentations, substantially as described.

In testimony whereof I have signed my name to this specification in the presence of two subscribing witnesses.

GEO. F. SIMONDS.

Witnesses:
JOS. P. LIVERMORE,
JAS. J. MALONEY.